(12) United States Patent
Trombetta

(10) Patent No.: US 10,237,584 B2
(45) Date of Patent: Mar. 19, 2019

(54) REAL-TIME INCORPORATION OF USER-GENERATED CONTENT INTO THIRD-PARTY CONTENT STREAMS

(71) Applicant: Sony Interactive Entertainment LLC, San Mateo, CA (US)

(72) Inventor: Steven Trombetta, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 15/489,179

(22) Filed: Apr. 17, 2017

(65) Prior Publication Data

US 2018/0302657 A1   Oct. 18, 2018

(51) Int. Cl.
| H04N 7/10 | (2006.01) |
| H04N 21/234 | (2011.01) |
| H04N 21/85 | (2011.01) |
| H04N 21/81 | (2011.01) |
| H04N 21/84 | (2011.01) |
| H04L 29/06 | (2006.01) |

(52) U.S. Cl.
CPC ... *H04N 21/23424* (2013.01); *H04L 65/4076* (2013.01); *H04L 65/605* (2013.01); *H04N 21/812* (2013.01); *H04N 21/84* (2013.01); *H04N 21/85* (2013.01)

(58) Field of Classification Search
CPC .. H04N 21/23434; H04N 21/84; H04N 21/85; H04N 21/812
USPC .......................................................... 725/32
See application file for complete search history.

(56) References Cited

U.S. PATENT DOCUMENTS

| 8,763,029 B1 * | 6/2014 | Haberman | ....... H04N 21/25435 725/32 |
| 8,782,720 B2 * | 7/2014 | Choi | ...................... H04N 7/147 725/87 |

(Continued)

FOREIGN PATENT DOCUMENTS

WO    WO 2018/194777    10/2018

OTHER PUBLICATIONS

PCT Patent Application No. PCT/US2018/023145 International Search Report and Written Opinion dated Apr. 19, 2018.
PCT/US18/023145, Shoutcasting, filed Mar. 19, 2018.

*Primary Examiner* — Michael B. Pierorazio
(74) *Attorney, Agent, or Firm* — Polsinelli LLP

(57) ABSTRACT

Systems and methods for real-time incorporation of user-produced content into a broadcast media stream are provided. A media title may be streamed to a producer computing device over a communication network. The producer computing device is associated with a channel for distributing the user-produced content in conjunction with the media title. Produced content may be captured from the producer computing device as the streamed media title is played on the producer computing device. Such captured produced content may be designated for the channel. The media title and the produced content may then be broadcast in real-time over the communication network to one or more subscriber devices subscribed to the channel. The media title and the produced content may be synchronized within the broadcast to reflect when the produced content was captured in relation to the media title as the media title was played on the producer computing device.

19 Claims, 3 Drawing Sheets

(56) References Cited

U.S. PATENT DOCUMENTS

| | | | | |
|---|---|---|---|---|
| 8,973,063 B2* | 3/2015 | Spilo | ............... | H04N 5/76 |
| | | | | 725/78 |
| 9,319,755 B2* | 4/2016 | Fusco | ............... | H04H 20/59 |
| 2005/0190794 A1* | 9/2005 | Krause | ............... | H04L 29/06027 |
| | | | | 370/485 |
| 2005/0251843 A1* | 11/2005 | Walker | ............... | H04N 7/165 |
| | | | | 725/117 |
| 2009/0187939 A1* | 7/2009 | Lajoie | ............... | G06Q 30/02 |
| | | | | 725/34 |
| 2010/0299715 A1* | 11/2010 | Slothouber | ............... | H04N 21/235 |
| | | | | 725/118 |
| 2010/0325658 A1* | 12/2010 | Schlack | ............... | H04N 21/23424 |
| | | | | 725/32 |
| 2011/0015989 A1* | 1/2011 | Tidwell | ............... | G06Q 30/02 |
| | | | | 705/14.43 |
| 2011/0016479 A1* | 1/2011 | Tidwell | ............... | G06Q 30/02 |
| | | | | 725/9 |
| 2011/0138414 A1* | 6/2011 | Koren | ............... | H04N 21/23424 |
| | | | | 725/35 |
| 2011/0302600 A1* | 12/2011 | Kelsen | ............... | H04N 21/2221 |
| | | | | 725/32 |
| 2014/0020013 A1* | 1/2014 | DiLorenzo | ............... | H04N 21/812 |
| | | | | 725/32 |
| 2014/0282777 A1* | 9/2014 | Gonder | ............... | H04L 65/605 |
| | | | | 725/109 |
| 2015/0039389 A1* | 2/2015 | Besehanic | ............... | G06Q 30/0201 |
| | | | | 705/7.29 |
| 2015/0256902 A1* | 9/2015 | Fusco | ............... | H04N 21/2221 |
| | | | | 725/33 |

* cited by examiner

REAL-TIME INCORPORATION OF USER-GENERATED CONTENT INTO THIRD-PARTY CONTENT STREAMS

BACKGROUND

1. Field of the Invention

The present technology pertains to streaming media, and more specifically to real-time incorporation of user-produced content into a broadcast media stream.

2. Description of the Related Art

Streaming media may be inclusive a variety of different types of content from different content providers. Such content may include television programs, movies, digital games, etc. Such content may include live broadcasts of events, including sporting events, breaking news events, awards ceremonies, speeches, etc.

Some media titles that are distributed through traditional television broadcasts may also be available to stream. Cable television providers, for example, may provide subscribers access to their television programming. The television programming is provided to the subscribers from one of many existing providers (e.g., DirecTV, Verizon, AT&T U-verse). By paying a subscription, subscribers are provided access (from a provider) to content associated with certain cable networks, such as HBO, MTV, and Cartoon Network. In some cases, users could buy one or more channels as desired. In other cases, users purchase two or more channels at one time via a bundle. In some instances, the cable network may operate their own subscription system for streaming content to subscribers. In addition, there are also online content services (e.g., Netflix, Hulu, Amazon Fire TV) that allow users to view streaming media and video on demand content on various computing devices (e.g., mobile device, laptop, desktop).

Presently available ways for users to add their own commentary and other related content to a particular media title (e.g., a television program episode) may include downloading the file for the media title (or clips thereof), recording their commentary in conjunction with the downloaded file, and then uploading the file with the recorded commentary to a distribution channel (e.g., Youtube®).

Another model for distributing user-generated content may include allowing a user to generate content, which may be streamed directly (e.g., Facebook Live, Twitch.tv) to a group of subscribers. Such user-generated content may be limited, however, to the content generated by the user. Where a user wishes to provide commentary on a media title generated by another, the user may be required to license or obtain certain permissions to the content or use only limited or low-quality versions of the content. Such requirements complicate, for example, on-the-fly production of high-quality commentary tracks in real-time for synchronized play with a high-quality, full-length stream of the media title being commented upon.

Disadvantages with such models may therefore include the user-generated content providing a less immediate experience, less context, lower quality of the original content, and less value to content providers (which may therefore reduce the available of media titles for which commentary may be coordinated and distributed).

There is, therefore, a need in the art for systems and methods of real-time incorporation of a user-produced content stream into a broadcast media stream

SUMMARY OF THE PRESENTLY CLAIMED INVENTION

Embodiments of the present invention include systems and methods for real-time incorporation of user-produced content into a broadcast media stream. A media title may be streamed to a producer computing device over a communication network. The producer computing device is associated with a channel for distributing the user-produced content in conjunction with the media title. Produced content may be captured from the producer computing device as the streamed media title is played on the producer computing device. Such captured produced content may be designated for the channel. The media title and the produced content may then be broadcast in real-time over the communication network to one or more subscriber devices subscribed to the channel. The media title and the produced content may be synchronized within the broadcast to reflect when the produced content was captured in relation to the media title as the media title was played on the producer computing device.

Various embodiments may include systems for real-time incorporation of user-produced content into a broadcast media stream. Such systems may include memory that stores information regarding a producer computing device associated with a channel, a network interface that streams a media title to the producer computing device over a communication network, and a processor that executes instructions that result in capture of produced content from the producer computing device as the streamed media title is played on the producer computing device. The captured produced content designated for the channel. The network interface may broadcast the media title and the produced content in real-time over the communication network to one or more subscriber devices subscribed to the channel in a synchronized manner within the broadcast to reflect when the produced content was captured in relation to the media title as the media title was played on the producer computing device.

Additional embodiments may include methods for real-time incorporation of user-produced content into a broadcast media stream. Such methods may include streaming a media title over a communication network to a producer computing device associated with a channel, capturing produced content from the producer computing device as the streamed media title is played on the producer computing device where the captured produced content designated for the channel, and broadcasting the media title and the produced content in real-time over the communication network to one or more subscriber devices subscribed to the channel. The media title and the produced content may be synchronized within the broadcast to reflect when the produced content was captured in relation to the media title as the media title was played on the producer computing device.

Further embodiments include non-transitory computer-readable storage media having embodied thereon a program executable by a processor to perform a method for real-time incorporation of user-produced content into a broadcast media stream as described above.

DETAILED DESCRIPTION

Embodiments of the present invention include systems and methods for real-time incorporation of user-produced content into a broadcast media stream. A media title may be streamed to a producer computing device over a communication network. The producer computing device is associated with a channel for distributing the user-produced content in conjunction with the media title. Produced content may be captured from the producer computing device as the streamed media title is played on the producer computing device. Such captured produced content may be designated for the channel. The media title and the produced content may then be broadcast in real-time over the communication network to one or more subscriber devices subscribed to the channel. The media title and the produced content may be synchronized within the broadcast to reflect when the produced content was captured in relation to the media title as the media title was played on the producer computing device.

Figure 1:
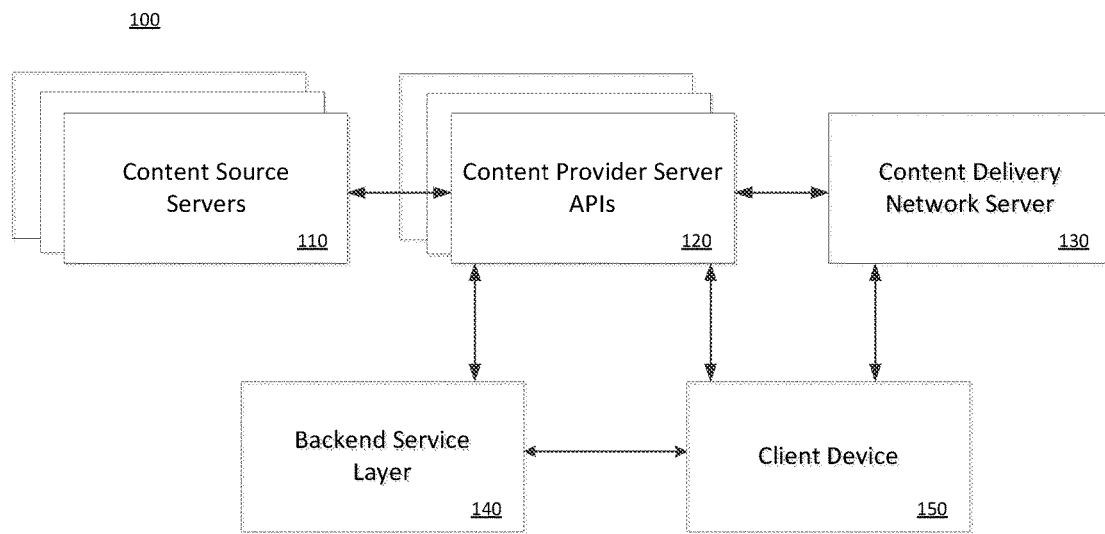
FIG. 1 illustrates a network environment in which a system for real-time incorporation of user-produced media into a broadcast media stream may be implemented.

FIG. 1 illustrates a network environment 100 in which a system for real-time incorporation of user-produced media into a broadcast media stream may be implemented. The network environment 100 may include one or more content source servers 110 that provide streaming content (e.g., video) for distribution (e.g., via one or more video on-demand (VOD) services), one or more content provider server application program interfaces (APIs) 120, content delivery network server 130, a backend service layer 140, and one or more client devices 150.

Content source servers 110 may maintain and provide media titles available for streaming. Such media titles may include not only pre-recorded content (e.g., DVR content), but also streams of live broadcasts (e.g., live sporting events, live e-sporting events, broadcast premieres). The content source servers 110 may be associated with any content provider that makes its content available to be streamed The streaming content from content source server 110 may be provided through a content provider server API 120, which allows various types of content sources server 110 to communicate with backend service layer 140. The content provider server API 120 may be specific to the particular language, operating system, protocols, etc. of the content source server 110 providing the streaming content. In a network environment 100 that includes multiple different types of content source servers 110, there may likewise be a corresponding number of content provider server APIs 120.

The content provider server API 120 therefore facilitates access of each of the client devices 150 to the content hosted by the content source servers 110. Additional information, such as metadata, about the accessed content can also be provided by the content provider server API 120 to the client device 150. As described below, the additional information (i.e. metadata) can be usable to provide details about the content being streamed to the client device 150. Finally, additional services associated with the accessed content such as chat services, ratings and profiles can also be provided from the content source servers 110 to the client device 150 via the content provider server API 120.

The content provider server API 120 can be accessed by a content delivery network server 130. The content delivery network server 130 may include a server that provides resources and files related to the streaming media, including promotional images and service configurations with client devices 150. The content delivery network server 130 can also be called upon by the client devices 150 that request to stream or subscribe to specific content.

The content provider server API 120 may be accessed by a backend service layer 140 in order to obtain information about available streaming content for the client device 150. As described below, the additional information about the content may include metadata describing the available content (e.g., by author, title, genre). The information may also include a location where the content is stored (e.g., URL) so that the user device can proceed with retrieving the content from the content source server 110. Furthermore, the (e.g., author, title, genre) 120 may include instructions for implementing functionalities (e.g., chat) that would allow different client devices 150 to interact with each other. Such instructions may be used by the backend service layer 140 to provide certain functionalities to the client device 150.

The backend service layer 140 may be responsible for communicating with the different content source servers 110 in order to provide that content to the client device 150. The backend service layer 140 may carry out instructions, for example, for identifying the format of a media title and formatting the media title so as to be playable on the client device 150. Such formatting may include identifying the metadata associated with each of the content then using various different types of conversion techniques so that data stored in one format at the content source servers 110 may be rendered and displayed on the client devices 150, which may require a different format. As such, media titles of different formats may be provided to and made compatible with client device 150 via the backend service layer 140.

'The client device 150 may include a plurality of different types of computing devices. For example, the client device 150 may include any number of different gaming consoles, mobile devices, laptops, and desktops. Such client devices 150 may also be configured to access data from other storage media, such as, but not limited to memory cards or disk drives as may be appropriate in the case of downloaded services. Such devices 150 may include standard hardware computing components such as, but not limited to network and media interfaces, non-transitory computer-readable storage (memory), and processors for executing instructions that may be stored in memory. These client devices 150 may also run using a variety of different operating systems (e.g., iOS, Android), applications or computing languages (e.g., C++, JavaScript). An exemplary client device 150 is described in detail herein with respect to FIG. 3.

Figure 2:
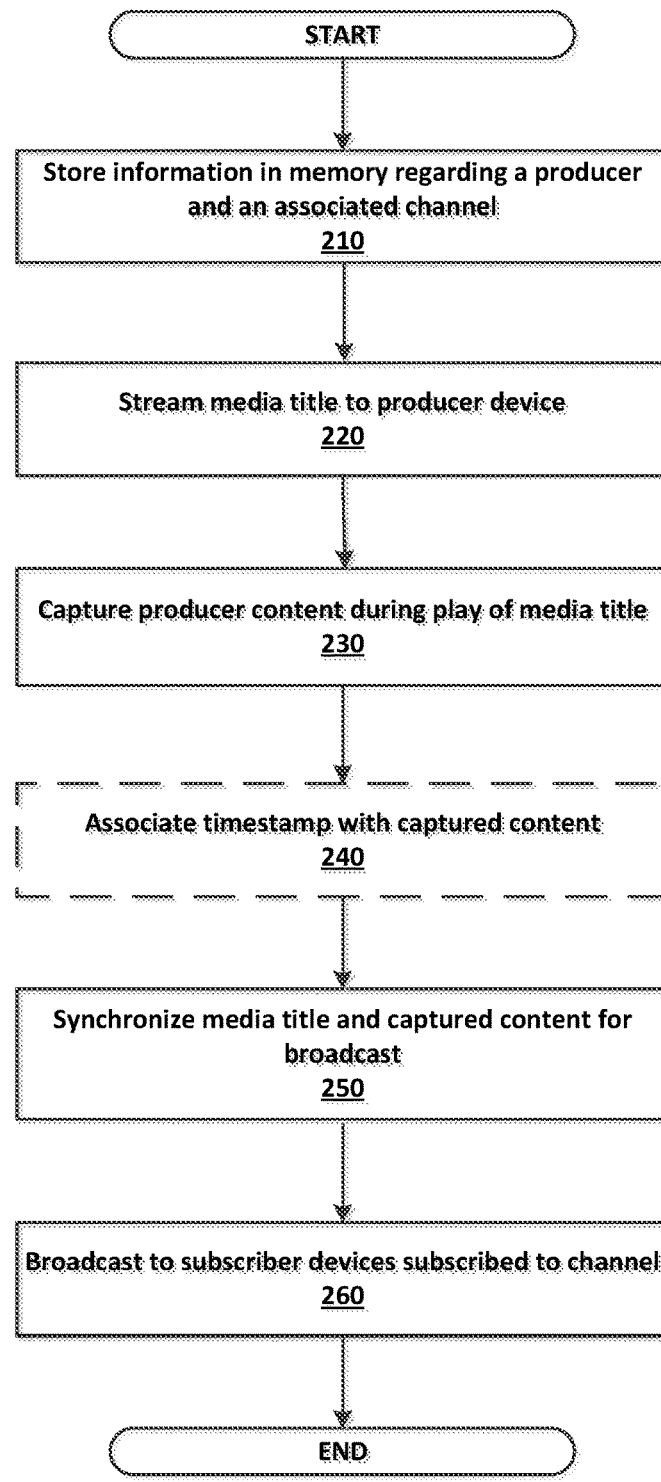
FIG. 2 is a flowchart illustrating an exemplary method for real-time incorporation of user-produced media into a broadcast media stream.

FIG. 2 is a flowchart illustrating an exemplary method 200 for real-time incorporation of user-produced media into a broadcast media stream. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200, information may be stored in memory regarding a producer and an associated channel, a media title may be streamed to the producer device, content generated at the producer device may be captured during play of the streamed media title, one or more timestamps may be associated with the captured content, and the media title and the captured content may be synchronized for broadcast to one or more subscriber devices that have subscribed to receive content from the channel.

In step 210, information may be stored in memory regarding a producer and an associated channel. A producer may establish a channel for distributing user-generated content (e.g., comprising commentary or other related content). The producer may be associated with authentication information (e.g., user name, password) that allows for an account to be established in association with the content distribution channel. In addition, various other devices in the network may subscribe to receive content distributed through the channel. Information regarding the producer, associated channel(s), and each channel's subscriber(s) may be maintained in memory. Where certain content providers require a specific subscription (e.g., "premium" cable content), the subscriber device may be required to have a subscription associated with the content provider in order to access content through the channel.

In step 220, a media title (e.g., a specified episode of a television program) may be streamed to the producer device. As discussed herein, the media title may include any type of pre-recorded or live media content available to be streamed over a communication network. Such media titles may originate from a content source server 110, formatted by content provider server API layer 120, and provided to backend service layer 140. The client device 150 may therefore play a beginning portion of the media title file during a continual download of subsequent portions.

In step 230, content generated by the producer may be captured during play of the media title file. Such producer-generated content may include audio or video commentary, reactions, background or other contextual asides, and other types of content related to the media title. Because the producer-generated content may be produced and captured during play of the media title, the timing of the producer-generated content may be correlated to with the timing of the media title. For example, the producer-generated content may start at a certain point within the timeline of the media title.

In step 240, one or more timestamps of the media title may be associated with the producer-generated content. Because the producer-generated content may be responsive to what is being shown as during play of the media title, such producer-generated content may not make sense or otherwise lack context when played in the absence of the media title or when played out of sync with the media title. As the producer-generated content is captured, however, one or more timestamps (e.g., reflecting a current point within the timeline of the playing media title) may be associated with certain points within the producer-generated content. Such producer-generated content may include audio, video, text, hashtags, links, graphics, and other types of content relevant to the media title.

In step 250, a broadcast may be prepared based on the media title and the producer-generated content. Such broadcast may comprise a single stream (e.g., in which the media title has been combined with the producer-generated content in a synchronized fashion) or two synchronized streams. The synchronization—which may be based on the timestamp information described with respect to step 240—allows for an audience (e.g., of subscribing devices) to experience play of the producer-generated content as captured in relation to the media title as the media title was played on the producer computing device. Such synchronization—and associated generation of a timestamp that provides the basis for such synchronization—may be controlled by producer computing device, content delivery network server 130, backend services layer 140, or the client device 150. In some embodiments, such synchronization occurs at the subscriber device 150. Various other means of synchronization may be utilized including multiplexing two or more streams of content into a single transport stream to allow for synchronous playback.

In some embodiments, the broadcast may be associated with a set of advertisements, which may be interspersed, overlaid, or otherwise played in conjunction with the broadcast. Such a set of advertisements may be selected or assigned based on the specific producer device, the specific channel, the specific subscriber device, various parameters related to the foregoing, or any combination thereof. Such advertisement may be served by an advertisement server associated with a third party provider, producer computing device, content source server 110, or content delivery network server 130.

In step 260, the broadcast is provided in real-time to subscriber devices that have subscribed to or otherwise requested to receive content from the channel. As the producer-generated content is being generated at the producer device, a broadcast comprising the synchronized media title and producer-generated content may be initiated. As such, there may be a small time delay between the streamed media title as played on the producer device and when the broadcast is provided to the subscriber device. The broadcast to subscribing device may be initiated, however, before the stream to producer device has completed its playtime. For example, a television broadcast of an original episode may be streamed to a producer computing device whose user may provide commentary, which may be captured and streamed in real-time to an audience of subscribers. In some embodiments, the broadcast—and information regarding the media title and the producer-generated content—may further be stored in memory and accessed via the channel associate d with the producer device. As such, a subscriber device may elect not to receive the synchronized broadcast in real-time, but rather access the broadcast later.

Figure 3:
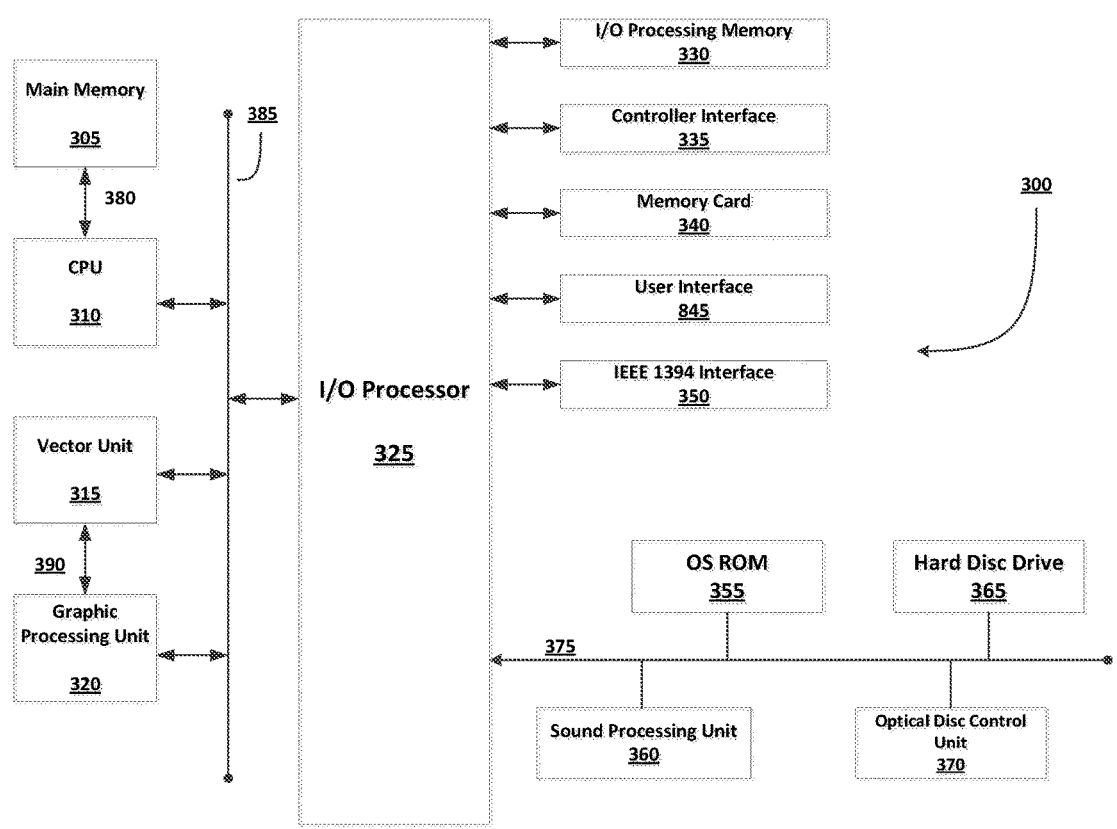
FIG. 3 is an exemplary electronic entertainment system that may be used in real-time incorporation of user-produced media into a broadcast media stream.

FIG. 3 is an exemplary electronic entertainment system that may be used in real-time incorporation of user-produced media into a broadcast media stream. The entertainment system 300 of FIG. 3 includes a main memory 305, a central processing unit (CPU) 310, vector unit 315, a graphics processing unit 320, an input/output (I/O) processor 325, an I/O processor memory 330, a controller interface 335, a memory card 340, a Universal Serial Bus (USB) interface 345, and an IEEE 1394 interface 350. The entertainment system 300 further includes an operating system read-only memory (OS ROM) 355, a sound processing unit 360, an optical disc control unit 370, and a hard disc drive 365, which are connected via a bus 375 to the I/O processor 325.

Entertainment system 300 may be an electronic game console. Alternatively, the entertainment system 300 may be implemented as a general-purpose computer, a set-top box, a hand-held game device, a tablet computing device, or a mobile computing device or phone. Entertainment systems may contain more or less operating components depending on a particular form factor, purpose, or design.

The CPU 310, the vector unit 315, the graphics processing unit 320, and the I/O processor 325 of FIG. 3 communicate via a system bus 385. Further, the CPU 310 of FIG. 3 communicates with the main memory 305 via a dedicated bus 380, while the vector unit 315 and the graphics processing unit 320 may communicate through a dedicated bus 390. The CPU 310 of FIG. 3 executes programs stored in the OS ROM 355 and the main memory 305. The main memory 305 of FIG. 3 may contain pre-stored programs and programs transferred through the I/O Processor 325 from a CD-ROM, DVD-ROM, or other optical disc (not shown) using the optical disc control unit 370. I/O Processor 325 of FIG. 3 may also allow for the introduction of content transferred over a wireless or other communications network (e.g., 4$, LTE, 1G, and so forth). The I/O processor 325 of FIG. 3 primarily controls data exchanges between the various devices of the entertainment system 300 including the CPU 310, the vector unit 315, the graphics processing unit 320, and the controller interface 335.

The graphics processing unit 320 of FIG. 3 executes graphics instructions received from the CPU 310 and the vector unit 315 to produce images for display on a display device (not shown). For example, the vector unit 315 of FIG. 3 may transform objects from three-dimensional coordinates to two-dimensional coordinates, and send the two-dimensional coordinates to the graphics processing unit 320. Furthermore, the sound processing unit 360 executes instructions to produce sound signals that are outputted to an audio device such as speakers (not shown). Other devices may be connected to the entertainment system 300 via the USB interface 345, and the IEEE 1394 interface 350 such as wireless transceivers, which may also be embedded in the system 300 or as a part of some other component such as a processor.

A user of the entertainment system 300 of FIG. 3 provides instructions via the controller interface 335 to the CPU 310. For example, the user may instruct the CPU 310 to store certain game information on the memory card 340 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A server system for real-time incorporation of user-produced content into a broadcast media stream, the system comprising:
   memory that stores information regarding a producer computing device associated with a channel;
   a network interface that streams a media title to the producer computing device over a communication network; and
   a processor that executes instructions stored in memory, wherein execution of the instruction by the processor captures produced content from the producer computing device in real-time as the streamed media title is played on the producer computing device, the captured produced content designated for the channel;
   wherein the network interface broadcasts the media title and the produced content over the communication network to one or more subscriber devices subscribed to the channel, wherein the media title and the produced content are synchronized at each of the one or more subscriber devices to reflect when the produced content was captured in relation to the media title as the media title was played on the producer computing device.

2. The system of claim 1, wherein memory further stores the synchronized broadcast in memory, wherein the stored broadcast is accessible at a subsequent time.

3. The system of claim 1, wherein access by the subscriber device to the synchronized broadcast is based on a subscription to the media title.

4. The system of claim 1, wherein the broadcast is associated with a set of advertisements that is different from a set of advertisements associated with another broadcast on another channel where the streamed media content is synchronized to different produced content.

5. The system of claim 1, wherein the broadcast as presented to a first subscriber device is associated with a set of advertisements that is different from a set of advertisements associated with the broadcast as presented to a second subscriber device.

6. The system of claim 1, wherein the network interface further receives the produced content in real-time as the produced content is being produced at the producer computing device.

7. The system of claim 6, wherein the produced content is associated with one or more corresponding timestamps of the streamed media title that is being played on the producer computing device as the produced content is captured, and wherein the synchronization is based on the corresponding timestamps.

8. The system of claim 1, wherein the broadcast comprises a single stream to each subscriber device.

9. The system of claim 1, wherein the broadcast comprises a plurality of streams provided to each subscriber device.

10. A method for real-time incorporation of user-produced content into a broadcast media stream, the method comprising:
   streaming a media title to a producer computing device over a communication network, wherein the producer computing device is associated with a channel;

capturing produced content from the producer computing device in real-time as the streamed media title is played on the producer computing device, the captured produced content designated for the channel; and broadcasting the media title and the produced content over the communication network to one or more subscriber devices subscribed to the channel, wherein the media title and the produced content are synchronized at each of the one or more subscriber devices to reflect when the produced content was captured in relation to the media title as the media title was played on the producer computing device.

11. The method of claim 10, further comprising storing the broadcast in memory, wherein the stored broadcast is accessible at a subsequent time.

12. The method of claim 10, further comprising controlling subscriber device access to the broadcast based on a subscription to the media title.

13. The method of claim 10, wherein the broadcast is associated with a set of advertisements that is different from a set of advertisements associated with another broadcast on another channel where the streamed media content is synchronized to different produced content.

14. The method of claim 10, wherein the broadcast as presented to a first subscriber device is associated with a set of advertisements that is different from a set of advertisements associated with the broadcast as presented to a second subscriber device.

15. The method of claim 10, further receiving the produced content in real-time over the communication network as the produced content is being produced at the producer computing device.

16. The method of claim 15, wherein the produced content is associated with one or more corresponding timestamps of the streamed media title that is being played on the producer computing device as the produced content is captured, and wherein the synchronization is based on the corresponding timestamps.

17. The method of claim 10, wherein the broadcast comprises a single stream to each subscriber device.

18. The method of claim 10, wherein the broadcast comprises a plurality of streams provided to each subscriber device.

19. A non-transitory computer-readable medium having embodied thereon a program executable by a processor to perform a method for real-time incorporation of user-produced content into a broadcast media stream, the method comprising:

streaming a media title to a producer computing device over a communication network, wherein the producer computing device is associated with a channel;

capturing produced content from the producer computing device in real-time as the streamed media title is played on the producer computing device, the captured produced content designated for the channel; and broadcasting the media title and the produced content over the communication network to one or more subscriber devices subscribed to the channel, wherein the media title and the produced content are synchronized at each of the one or more subscriber devices to reflect when the produced content was captured in relation to the media title as the media title was played on the producer computing device.

\* \* \* \* \*